Nov. 28, 1950     N. CORDIS     2,532,088
CLEANSING APPARATUS
Filed Nov. 1, 1947
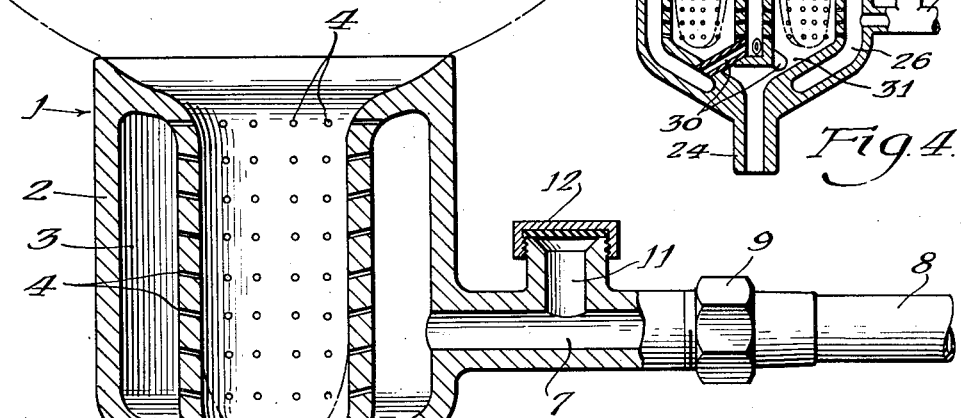
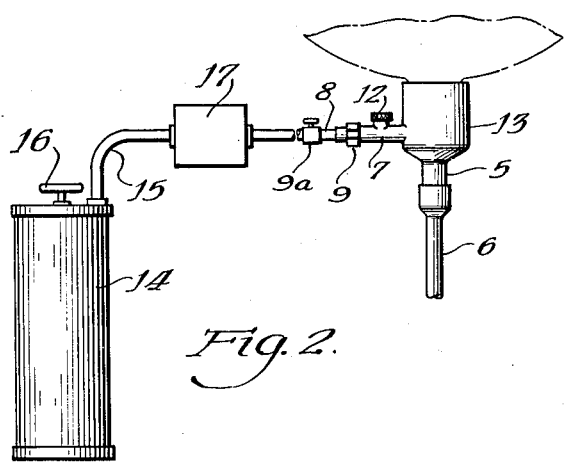
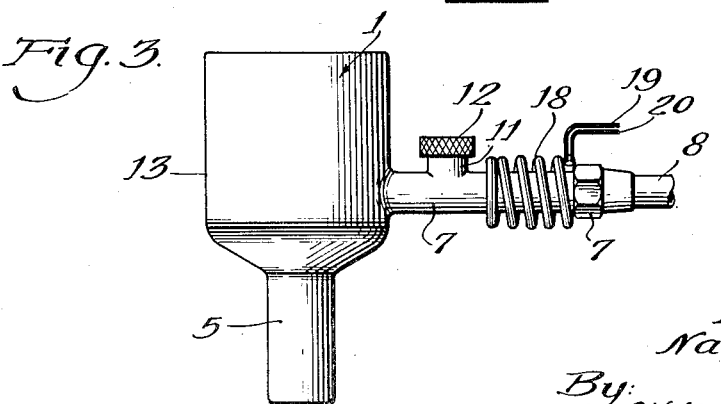
Inventor:
Nat Cordis
By William S. Nordburg Jr.
Attorney Patented Nov. 28, 1950

2,532,088

UNITED STATES PATENT OFFICE 2,532,088

CLEANSING APPARATUS

Nat Cordis, Silver Lake, Wis.

Application November 1, 1947, Serial No. 783,547

4 Claims. (Cl. 119—1)

This invention relates to a cleansing apparatus, and more particularly to an apparatus for cleansing the udders and teats of cows prior to milking.

It is presently the practice, prior to milking a cow with an automatic milking machine, to wash the udders and the teats of cows with a damp cloth. Warm water may be used or sometimes a warm antiseptic solution. Two difficulties result, however, from this practice; one being that the farm hands will use the same rag for each of the cows without rinsing it out and hence an unsanitary condition results. The second is that frequently in washing, a farm hand will become careless and drip or splash water which will wet the bedding of the cow. This is an undesirable condition since after milking, the cow usually lies down and will become chilled if the bedding is not changed.

It is, therefore, an object of this invention to provide an apparatus which can be used by farmers and their hired hands for cleaning cows prior to milking, which apparatus will insure sterile cleaning of each cow as well as reduce to a minimum the danger of splashing and hence of wetting a cow's bed. It is a further object to provide an apparatus that can be used to wash a cow with a running stream of warm water or of antiseptic solution, and it is still a further object to provide drainage means which will carry away the wash water or solution without danger of moistening or dampening the cow's bed. Other objects and advantages of my invention will be apparent from the following description.

I have provided a liquid internal spray device which is particularly adapted to fit over the teat of a cow and to receive warm water from an external source and guide the water through spray holes on to the cow. The device is further provided with an integral drain pipe which may be connected to a suitable hose so as to carry off the spray water to any suitable receptacle or sewer. Where warm water is not available, on one modification of my device I provide a heating coil, which serves to warm cold water supplied thereto. I further provide my spray device with means for introducing an antiseptic, preferably in the form of a tablet, so that the water entering the device dissolves a portion of the antiseptic and thence becomes an antiseptic solution.

My invention will be better understood by reference to the following detailed description of my invention and to the attached drawing forming a part thereof wherein:

Fig. 1 is a vertical section of a preferred form of my cleansing apparatus.

Fig. 2 is a diagrammatic illustration of a preferred manner of using my cleansing apparatus.

Fig. 3 is another modification of my cleansing apparatus including a self-contained heating unit.

Fig. 4 is a vertical section of an embodiment of my washing apparatus adapted to wash all four teats of the cow in one operation.

My spray device comprises a generally tubular body member 1 which is preferably made of aluminum. One end is enlarged and forms a cup 2 having an annular chamber therein 3, which serves as a header for a plurality of spray nozzles 4 formed by a plurality of holes in the inner wall of the cup. The lower portion of body 1 is of small diameter and serves as a drain pipe 5 for the cup portion to which may be fitted a suitable hose 6. Liquid is introduced into the chamber 3 through inlet tube 7 through a hose 8 connected by a conventional ferrule 9. A hand operated valve 9a is preferably provided in the hose.

The cup portion 2 is shaped to receive and conform with the teat of a cow and the top part of the inner wall has a concave configuration at 10 which will receive the udder and thus the cup is sealed against splashing without irritating the cow. The remaining part of the cup is shaped to conform with the teat of the cow so as to insure uniform cleansing. To further insure against wetting the bedding, each of the spray nozzles 4 directs the spray horizontally or downwardly toward the drain.

In the inlet nozzle of the spray, I have provided an opening 11, which is provided with a suitable cap 12, through which an antiseptic can be introduced, preferably in the form of a pill which will lodge itself in the path of the entering water until partially dissolved. As it reduces in size, it will be carried into chamber 3 and continued to be dissolved to provide continuously an antiseptic solution.

A preferable manner of using my spray device is shown in Fig. 2. A sprayer 13 is shown in the position it would be held by an operator. The water inlet is connected to a pressure tank 14 by tubing 15. The tank is provided with a suitable pump 16 for building up a pressure within the tank. Where only cold water is available, a heater 17 of any suitable type, but preferably an electric water heater, may be included between the tank and the sprayer so that the water serving as a spray is warmed and hence will not thermally shock the cow. Where, of course, a source of water and sufficinet hose is available, the pressure tank may be dispensed with and if the water source is warm, then the heater may be dispensed with.

In Fig. 3, I have shown an embodiment which is particularly adaptable for use where a cold water source is available as well as electric power. In this form, the sprayer 13 has mounted on the inlet end thereof a resistance heater 18 having suitable insulated wires 19 and 20.

In the above modifications I have shown apparatus which may easily and readily be used to wash one teat at a time. In Fig. 4, I show apparatus which is adapted to wash all four of the cows' teats in one operation. This apparatus is generally similar to that shown in the other modifications in that it comprises a generally tubular-shaped body 21 having the upper end enlarged to form a cup 22. The cup 22 is sufficiently large in diameter to receive all four teats illustrated by the dotted lines, and the upper edge of the cup 23 is concave as in the other embodiments so as to receive the udder of the cow and form therewith a seal for the top of the cup, thus preventing splashing. Body 21 is provided at its lower end with an elongated drain pipe 24. A suitable inlet 25 may be connected to a hose for introducing water into a hollow annular chamber 26 which, as in the other embodiments, serves as a header for the spray water which passes through the spray holes 27 in the inner wall of the cup.

In order to effectuate cleaning of all sides of the teats, which is accomplished in the previously described embodiments by conforming the shape of the cup to that of the teat, there is provided within cup 22 a central spray tube 28 provided with a plurality of spray holes 29, about its outer surface. The tube is supported by tubular braces 30 which are in communication with the annular chamber 26. The braces are suitably spaced so that the cup may drain through an annular passage 31 formed between the spray tube and the entrance to the drain pipe.

Other embodiments of my invention will be apparent to those skilled in the art in view of the above description and no limitations are intended thereby except as are contained in the following claims.

I claim:

1. A spray for washing the teats of a cow prior to milking comprising a hollow cup-shaped body comprising an inner wall and an ambient outer wall, said body being adapted to receive the teats of a cow and having spray holes in the inner wall thereof, a drain pipe in the base of said body and having communication with the interior of said body, a liquid inlet in communication with said spray holes, and a spray tube centrally disposed with said body operably connected to said liquid inlet.

2. The spray of claim 1 wherein spray-holes are directed downwardly and wherein said body is provided with a concaved annular surface.

3. The spray device of claim 1 wherein the internal surface of said cup portion is concave at the upper end thereof so as to receive and conform to the udder of a cow, whereas the opposing end of said body is of reduced diameter and adapted to receive a discharge tube.

4. The spray device of claim 1 wherein said inlet is provided with an opening for receiving antiseptic, said opening being provided with a removable cap.

NAT CORDIS.

REFERENCES CITED

The following references are of record in the file of this patent:

UNITED STATES PATENTS

| Number | Name | Date |
| --- | --- | --- |
| 999,956 | Campbell | Aug. 8, 1911 |
| 1,178,817 | Murton | Apr. 11, 1916 |
| 1,684,047 | Stoven | Sept. 11, 1928 |
| 1,899,495 | Celaya | Feb. 28, 1933 |
| 2,228,698 | Fitches | Jan. 14, 1941 |
| 2,320,133 | Horwitz | May 25, 1943 |

FOREIGN PATENTS

| Number | Country | Date |
| --- | --- | --- |
| 33,796 | Sweden | July 25, 1911 |